United States Patent

Flood et al.

[11] Patent Number: 5,863,489
[45] Date of Patent: *Jan. 26, 1999

[54] METHOD OF BLOW-MOULDING

[75] Inventors: Nicholas Flood; Patrick Beirne, both of County Westmeath, Ireland

[73] Assignee: Menza Limited, Castlepollard, Ireland

[ * ] Notice: This patent issued on a continued prosecution application filed under 37 CFR 1.53(d), and is subject to the twenty year patent term provisions of 35 U.S.C. 154(a)(2).

[21] Appl. No.: 767,481

[22] Filed: Dec. 16, 1996

[30] Foreign Application Priority Data

Oct. 25, 1996 [IE] Ireland ..................................... 960750

[51] Int. Cl.⁶ .................................................. B29C 49/60
[52] U.S. Cl. ......................... 264/531; 264/504; 425/536
[58] Field of Search .................... 264/531, 504, 264/526, 528, 529, 540; 425/536

[56] References Cited

U.S. PATENT DOCUMENTS

| | | | |
|---|---|---|---|
| 3,089,185 | 5/1963 | Di Settembrini | 264/526 |
| 3,450,805 | 6/1969 | Chesser | 264/526 |
| 3,571,848 | 3/1971 | Szajna . | |
| 3,592,886 | 7/1971 | Havely | 264/526 |
| 3,873,661 | 3/1975 | Kontz . | |
| 3,973,896 | 8/1976 | Peters | 425/536 |
| 4,025,276 | 5/1977 | Peters | 425/536 |
| 4,092,389 | 5/1978 | Sakurai . | |
| 4,799,876 | 1/1989 | Peters . | |
| 5,078,948 | 1/1992 | Troutman et al. | 425/536 |

FOREIGN PATENT DOCUMENTS

| | | | |
|---|---|---|---|
| 1475911 | 4/1967 | France | 425/536 |
| 5-69476 | 3/1993 | Japan | 425/536 |
| 1481784 | 8/1977 | United Kingdom . | |
| 2275441 | 8/1994 | United Kingdom . | |

*Primary Examiner*—Catherine Timm
*Attorney, Agent, or Firm*—Jacobson, Price, Holman & Stern, PLLC

[57] ABSTRACT

A parison 4 of hot thermoplastics material is delivered into a mould 1 comprising two mould halves 2, 3 which are closed towards one another. A stress force is applied to the wall of the parison 4 either by a projection 5 extending from one of the mould halves 3 and/or by blowing air at a low pressure against the parison 4 through a blow pin 10. The parison 4 is then penetrated by the blow pin and high pressure air is blown through the blow pin 10 to inflate the parison 4 against the mould halves 2, 3. The blow pin 10 is withdrawn and a formed article such as a case is released from the mould after a preset time.

9 Claims, 3 Drawing Sheets

METHOD OF BLOW-MOULDING

The invention relates to a method of blow-moulding thermoplastics material to form a blow moulded article such as a case, for example, a tool case comprising two case halves having an integrally moulded hinge therebetween.

It is known to form such blow-moulded articles by firstly extruding a tube or parison of hot thermoplastics material, bringing two halves of a mould together on opposite sides of the parison and inserting a blow pin through the mould into the parison. Air is then blown into the interior of the parison through the blow pin at high pressure to inflate the thermoplastics material against the walls of the mould. After a preset time when the moulding has set, the two halves of the mould are separated and the moulded article is released.

In conventional arrangements, the blow pin which penetrates the wall of the mould comprises a sharpened tip which is normally chamfered. On penetration, the sharpened tip essentially rips through the wall of the parison resulting in a ragged edge through which air may back-leak out from the mould. Because of this, a relatively low moulding pressure of between 3 and 5 bar is generally only achievable using conventional technology. This results in an unsatisfactory surface finish as the air pressure is insufficient to avoid flow wrinkles being visible on the surface of the moulding where distribution of thermoplastics material has been uneven. Further, the small apertures left in the moulding after withdrawal of the blow pins are frequently poorly formed which again detracts from the surface finish of the finished product.

It is also known from UK-A-2275441A to blow air at a higher pressure of 10 bar through a blow pin to deform an outer skin of the thermoplastics material as the mould parts are closing. The blow pin is then inserted through the skin and an article such as a case is blow moulded. In this known arrangement the pin has a blunt tip and a tubular sleeve forms around the pin to sleeve the pin as it is operated. This assists in preventing leak-back of air and facilitates higher cycle times with improved surface finish.

However, the control of the blow pin during the operation of this known system is sometimes difficult and consequently the blow moulding cycle and surface finish are not fully optimised.

This invention is therefore directed towards providing an improved method of blow moulding which will overcome at least some of these difficulties.

STATEMENTS OF INVENTION

According to the invention there is provided a method of blow-moulding thermoplastics material comprising the steps of:

extruding a parison of hot thermoplastics material;
slowly closing a pair of mould halves around the extruded parison;
applying a stress force to the wall of the parison as the mould halves are being closed;
penetrating the parison by passing a blow pin through the deformation formed in the wall of the parison;
blowing high pressure air through the blow pin to inflate the parison against the walls of the mould halves;
withdrawing the blow pin; and
releasing a formed article from the mould after a preset time.

In one embodiment of the invention, a stress force is applied to the wall of the parison by blowing air at a low pressure against the parison through the blow pin.

Alternatively or additionally, a stress force is applied to the wall of the parison by providing a projection from the mould surface over which the parison passes. In this case, preferably the projection is provided in the region of the blow pin. Most preferably, the projection is defined by a sleeve in which the blow pin is mounted for movement between a retracted and an extended position.

In a particularly preferred embodiment of the invention the mould halves are closed in timed relation to the blowing of the low pressure air.

Preferably the wall of the parison is deformed by blowing low pressure air at a pressure of from 3 to 5 bar against the parison.

Preferably the high pressure air at a pressure of from 8 to 10 bar is blown through the blow pin to inflate the parison.

In one embodiment of the invention the low pressure air is blown through a parison deforming outlet hole at the end of a blowing pin to provide a stream of low pressure air directed against the parison to deform the parison at the point of entry of the blowing pin into the parison. Preferably, after insertion of the blow pin into the parison, the high pressure air is blown through blow pin inflation outlet means in a side wall of the blow pin to inflate the parison against the walls of the mould. Typically the blow pin inflation means comprises at least two outlets in the side wall of the blow pin.

There may be two blow pin inflation outlets which are substantially diametrically opposed in the side wall of the blow pin. Alternatively the blow pin inflation means comprises four outlets spaced-apart around the side wall of the blow pin.

In one embodiment of the invention the parison deforming outlet also provides a blow pin inflation outlet.

In a preferred arrangement the mould halves are closed to a distance of less than 100 mm apart before low pressure air is blown against the parison. Preferably the mould halves are closed to a distance of less than 25 mm apart before low pressure air is blown against the parison.

In a particularly preferred embodiment the method includes the step of initiating a timer to control the blowing of the low pressure air on partial closing of the mould halves.

The invention also provides a blow moulded article, especially a blow moulded case whenever produced by the method of the invention.

DETAILED DESCRIPTION

Figure 1:
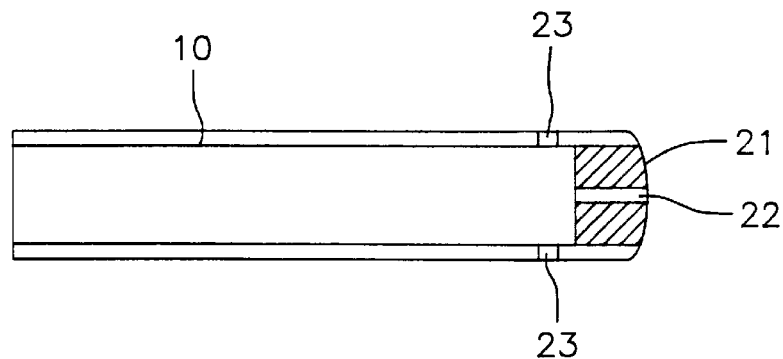
Figure 3:
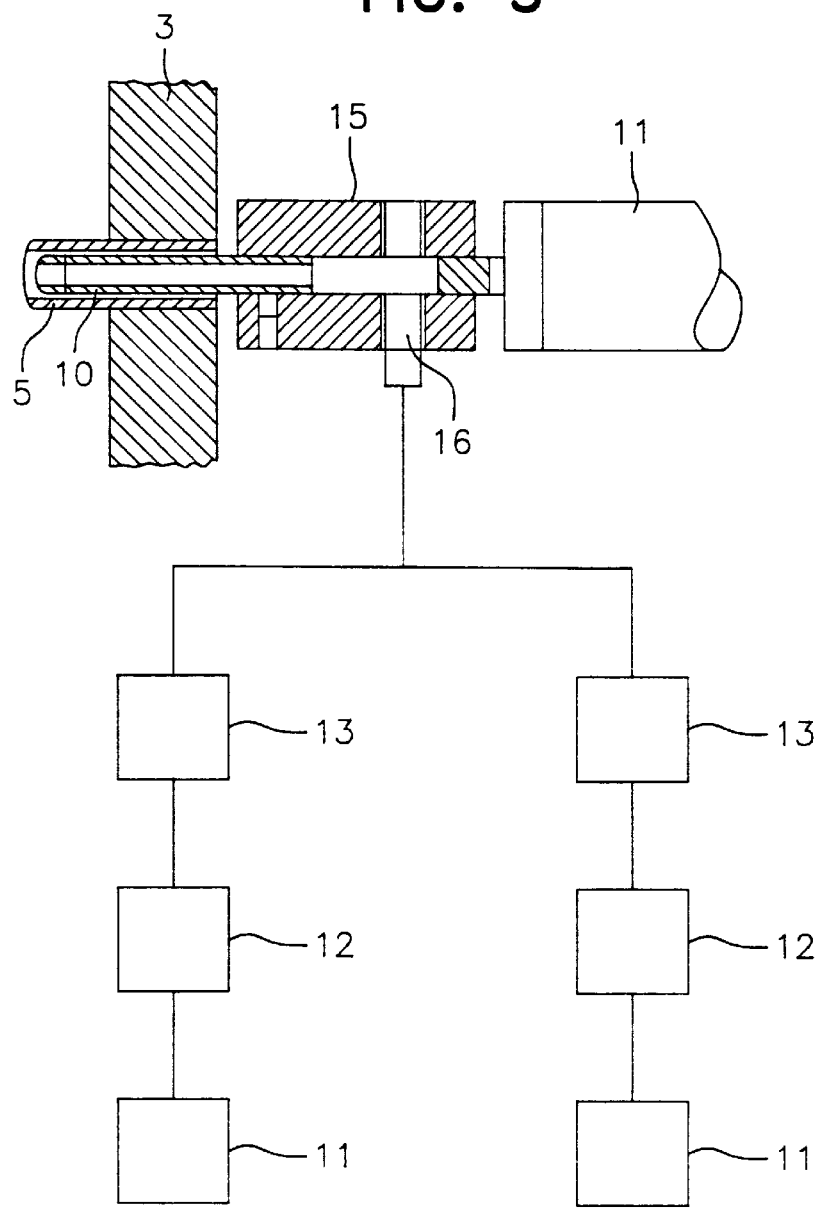

The invention will be more clearly understood from the following description thereof, given by way of example only with reference to the accompanying drawings in which:

FIG. 1 is a diagrammatic cross sectional view of a blow pin used in the method of blow moulding according to the invention;

FIGS. 2(*a*) to 2(*g*) are diagrammatic side cross sectional views illustrating steps in the method of blow moulding of the invention; and FIG. 3 is a diagrammatic cross sectional view of control apparatus used in the method of the invention.

Figure 2A:
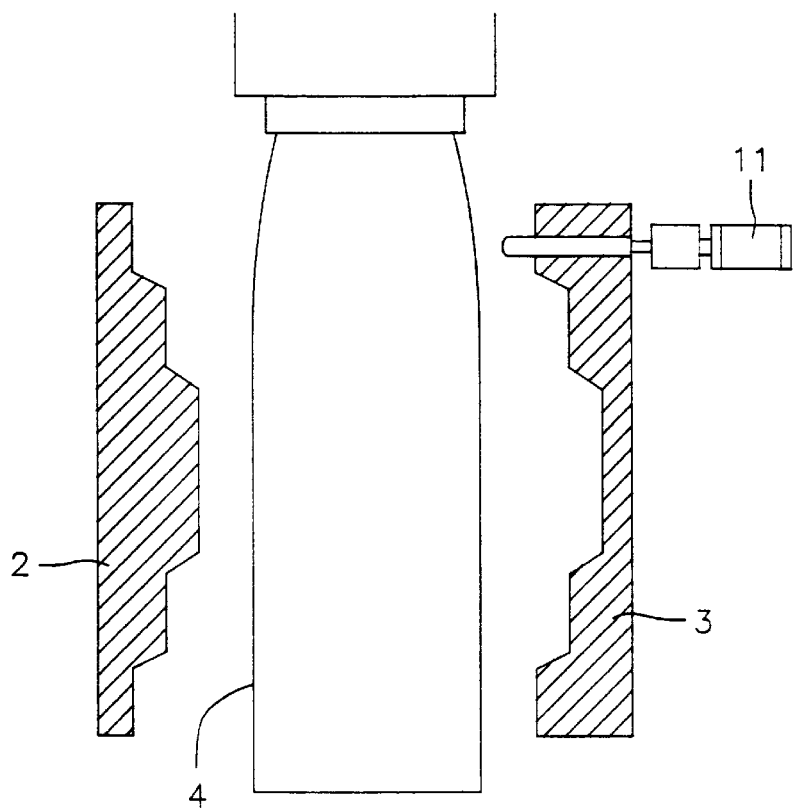
Figure 2B:
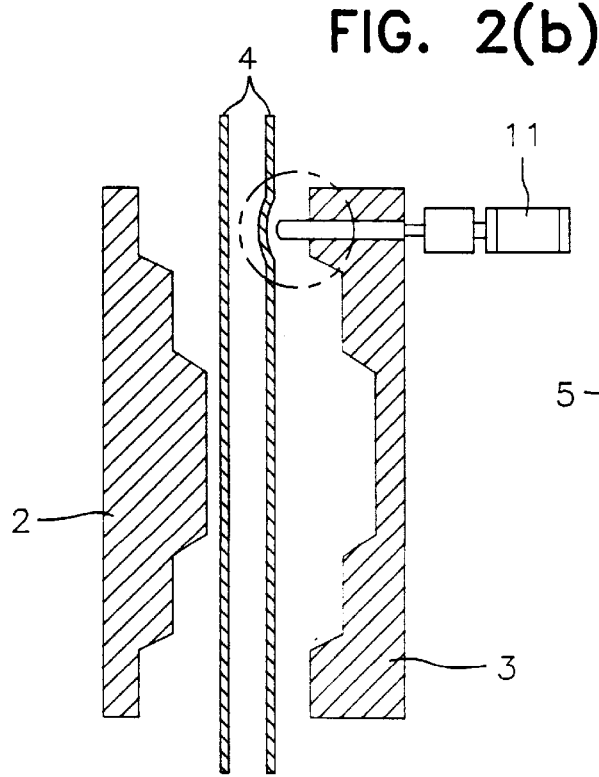
Figure 2C:
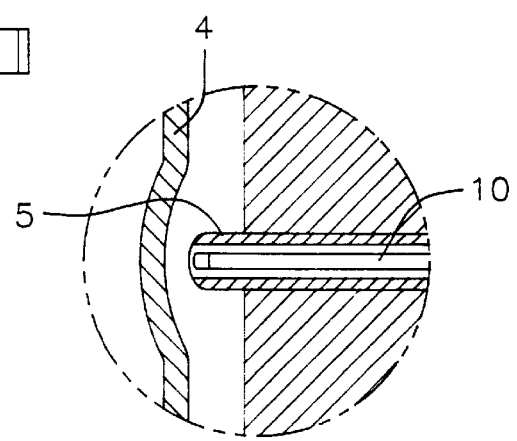

Referring to the drawings, there is illustrated a method of blow-moulding thermoplastics material according to the invention. A blend of thermoplastics material is delivered into a mould 1 comprising two mould halves 2,3. A parison 4 of hot thermoplastic material is extruded as the mould halves 2,3 are closed towards one another. In this case, a stress force is applied to the wall of the parison 4 by a projection 5 extending from one of the mould halves 3 over which the parison 4 is passed. The projection 5 defines a sleeve for a blow pin 10 which is movable by a piston 11 from a retracted position as illustrated in FIGS. 2(a), 2(b) and 2(c) to extended positions illustrated in FIGS. 2(d), 2(e) and 2(f). As the parison 4 flows over the mould half 3, it is pretensioned by the projection or sleeve 5 as illustrated in FIG. 2(b). In this arrangement, the pre-close distance d between the mould halves 2, 3 is at most 100 mm and is typically 25 mm.

Figure 2D:
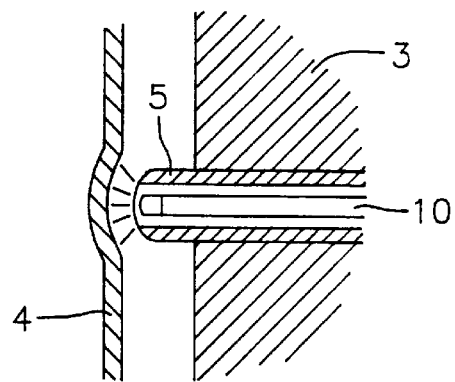
Figure 2E:
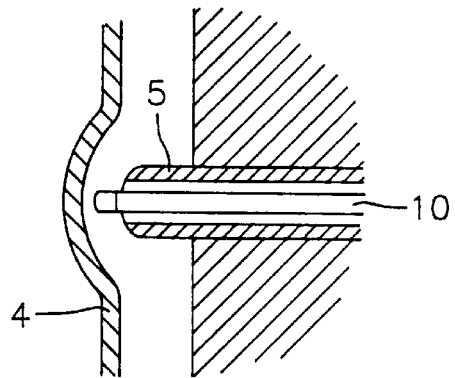
Figure 2F:
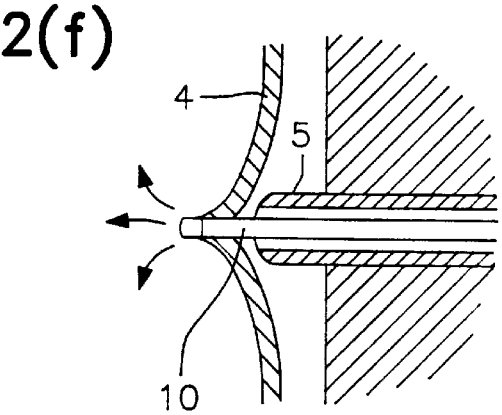
Figure 2G:
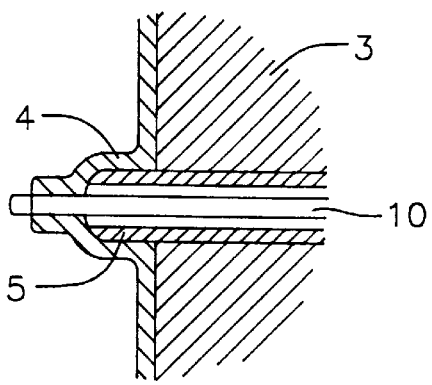

In the method of the invention, after partial closing of the mould halves 2,3, low pressure air at a pressure of from 3 to 5 bar is blown through the blow pin against the parison 4 as illustrated in FIG. 2(c). The stream of low pressure air deflects the wall of the parison 4. The mould halves 2,3 continue to close in timed relation to the blowing of the low pressure air and the parison 4 is further pre-shaped as illustrated in FIG. 2(d). The blowing of low pressure air is continued and the blow pin 10 is further extended during further closing of the mould halves 2,3 until the air and blow pin 10 breaks through the parison 4 as illustrated in FIG. 2(e). Finally, an air seal is formed by blowing high pressure air at a pressure of from 7 to 10 bar through the blow pin 10 as illustrated in FIG. 2(f). In this configuration, the mould halves 2,3 are fully closed.

After a preset time allowed for the moulded article thus formed to set, the blow moulded article is released from the mould. The article may be a blow moulded case for speciality tools and the like.

The blow pin 10 is operated under the control of a control system illustrated in FIG. 3 and comprising a proximity switch 11 to monitor when the mould halves 2,3 are in the pre-close position illustrated in FIG. 3, a delay timer 12 and a low pressure solenoid valve 13. A similar control system is provided for high pressure air. The blow pin 10 is mounted in a mounting block 15 having an inlet port 16 for high pressure air at a pressure of typically 8 to 10 bar and for low pressure air at a pressure of typically 3 to 5 bar.

In more detail, and referring particularly to FIG. 1 the blow pin 10 has a rounded tip 21 to prevent damage to a parison 4 on insertion. The tip 21 in this case has a single parison deforming outlet hole 22. Blow pin inflation outlet means is in this case provided by two substantially diametrically opposed blow pin inflation outlet holes 23 in the side wall of the blow pin 10 stepped back from the tip 21 of the pin 10.

It will be appreciated that a stress force may be applied to the wall of the parison either by providing a projection from a mould over which the parison wall passes and/or by blowing air at a low pressure against the parison through a blow pin.

The invention offers very considerable advantages. Because of the lower pressure used, the delayed mould closing, the controlled timing and the modified blow pin it is possible to form blow holes more reliably than by using standard techniques. Lighter walled parisons may be used resulting in materials savings. Different materials which have lower melt strengths may also be used. In addition, production efficiency is optimised as there is no risk of blockages in the blow pin.

A substantially improved surface finish is also achieved. In addition, there is improved contact of the thermoplastics with the mould surface with consequent improved heat transfer and cooling efficiencies which in turn leads to lower cycle times and improved rates of production.

As the quality of the moulded article as produced using the method of the invention is improved there is a lower reject rate on testing, with consequent increase in production.

The invention is not limited to the embodiments hereinbefore described, but may be varied in both construction and detail.

We claim:

1. A method of blow-moulding thermoplastics material in a blow moulding apparatus including a pair of mould halves, a blow pin having a rounded penetrating tip, the penetrating tip having an air outlet, and a sleeve in the form of a projection from one of the mould halves, the blow pin being mounted in the sleeve for movement between a retracted position and an extended penetrating position, the method comprising the steps of:

extruding a parison of hot thermoplastics material;

partially closing the pair of mould halves around the extruded parison;

applying a localized stress force to a blow-pin receiving area of a wall of the parison to pre-stress the receiving area as the mould halves are closed;

the localized stress force being applied by engaging the sleeve against the parison and applying air through the outlet hole in the penetrating tip of the blow pin in the retracted position in the sleeve at a low pressure of from 3 to 5 bar as the mould halves continue to close;

moving the blow pin into the projected position and penetrating the pre-stressed area of the parison with the rounded tip of the blow pin on closing of the mould halves, blowing high pressure air at a pressure of at least 8 bar through the blow pin when the mould halves are closed and the parison is penetrated by the blow pin to form an air seal between the parison and the blow pin and to inflate the parison against the walls of the mould halves and form a blow-moulded article;

withdrawing the blow pin from the blow-moulded article; and releasing the blow-moulded article from the mould after a preset time.

2. A method as claimed in claim 1, wherein the high pressure air is at a pressure of from 8 to 10 bar.

3. A method as claimed in claim 1 wherein, after insertion of the blow pin into the parison, the high pressure air is blown through blow pin inflation outlet means in a side wall of the blow pin to inflate the parison against the walls of the mould.

4. A method as claimed in claim 3 wherein the blow pin inflation means comprises at least two outlets in the side wall of the blow pin.

5. A method as claimed in claim 4 wherein there are two blow pin inflation outlets which are substantially diametrically opposed in the side wall of the blow pin.

6. A method as claimed in claim 3 wherein the blow pin inflation means comprises four outlets spaced-apart around the side wall of the blow pin.

7. A method as claimed in claim 1 wherein the mould halves are closed to a distance of less than 100 mm apart before low pressure air is blown against the parison.

8. A method as claimed in claim 1 wherein the mould halves are closed to a distance of less than 25 mm apart before low pressure air is blown against the parison.

9. A method as claimed in claim 1 including the step of initiating a timer to control the blowing of the low pressure air on partial closing of the mould halves.

* * * * *